US012687904B2

(12) United States Patent
Kim

(10) Patent No.: US 12,687,904 B2
(45) Date of Patent: Jul. 21, 2026

(54) INTEGRATED CIRCUIT CAPABLE OF PERFORMING DYNAMIC VOLTAGE AND FREQUENCY SCALING OPERATION BASED ON WORKLOAD AND OPERATING METHOD THEREOF

(71) Applicant: Samsung Electronics Co., Ltd., Suwon-si (KR)

(72) Inventor: Gyehyung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 65 days.

(21) Appl. No.: 18/447,576

(22) Filed: Aug. 10, 2023

(65) Prior Publication Data

US 2024/0053809 A1 Feb. 15, 2024

(30) Foreign Application Priority Data

Aug. 12, 2022 (KR) ........................ 10-2022-0101594
Dec. 7, 2022 (KR) ........................ 10-2022-0170043

(51) Int. Cl.
*G06F 1/26* (2006.01)

(52) U.S. Cl.
CPC ..................................... *G06F 1/26* (2013.01)

(58) Field of Classification Search
CPC ...................................................... G06F 1/26
See application file for complete search history.

(56) References Cited

U.S. PATENT DOCUMENTS

| | | | |
|---|---|---|---|
| 7,685,446 B2 | 3/2010 | Hong et al. | |
| 8,250,394 B2 | 8/2012 | Agrawal | |
| 8,347,129 B2 | 1/2013 | Paik | |
| 8,990,604 B2 | 3/2015 | Patel | |
| 9,563,250 B2 | 2/2017 | Rychlik et al. | |
| 10,579,093 B2 | 3/2020 | Seenappa et al. | |
| 10,606,335 B2 * | 3/2020 | Gu | G06F 1/324 |
| 11,209,886 B2 | 12/2021 | Hovis et al. | |
| 2008/0235364 A1 * | 9/2008 | Gorbatov | G06F 1/324 |
| | | | 709/224 |
| 2016/0124778 A1 * | 5/2016 | Vanka | G06F 1/324 |
| | | | 719/313 |
| 2016/0154449 A1 * | 6/2016 | Lim | G06F 1/324 |
| | | | 713/322 |
| 2016/0239065 A1 * | 8/2016 | Lee | G06F 1/3296 |
| 2017/0192484 A1 * | 7/2017 | Priyadarshi | G06F 1/324 |
| 2019/0265777 A1 * | 8/2019 | Lee | G06F 9/50 |

* cited by examiner

*Primary Examiner* — Jaweed A Abbaszadeh
*Assistant Examiner* — Ayman Fatima
(74) *Attorney, Agent, or Firm* — Harness, Dickey & Pierce, P.L.C.

(57) ABSTRACT

Provided are an integrated circuit capable of classifying a workload of a core based on monitored data and performing a dynamic voltage and frequency scaling (DVFS) operation based on the classified workload, and an operating method of the integrated circuit. The integrated circuit includes at least one core, a shared buffer which receives a request from the at least one core, access an external memory according to the request, and receive a response from the external memory, a monitor which monitors the shared buffer to obtain a buffer capacity of the shared buffer and a response waiting time, and a DVFS controller configured to classify a workload of the at least one core.

19 Claims, 12 Drawing Sheets

Figure 5:
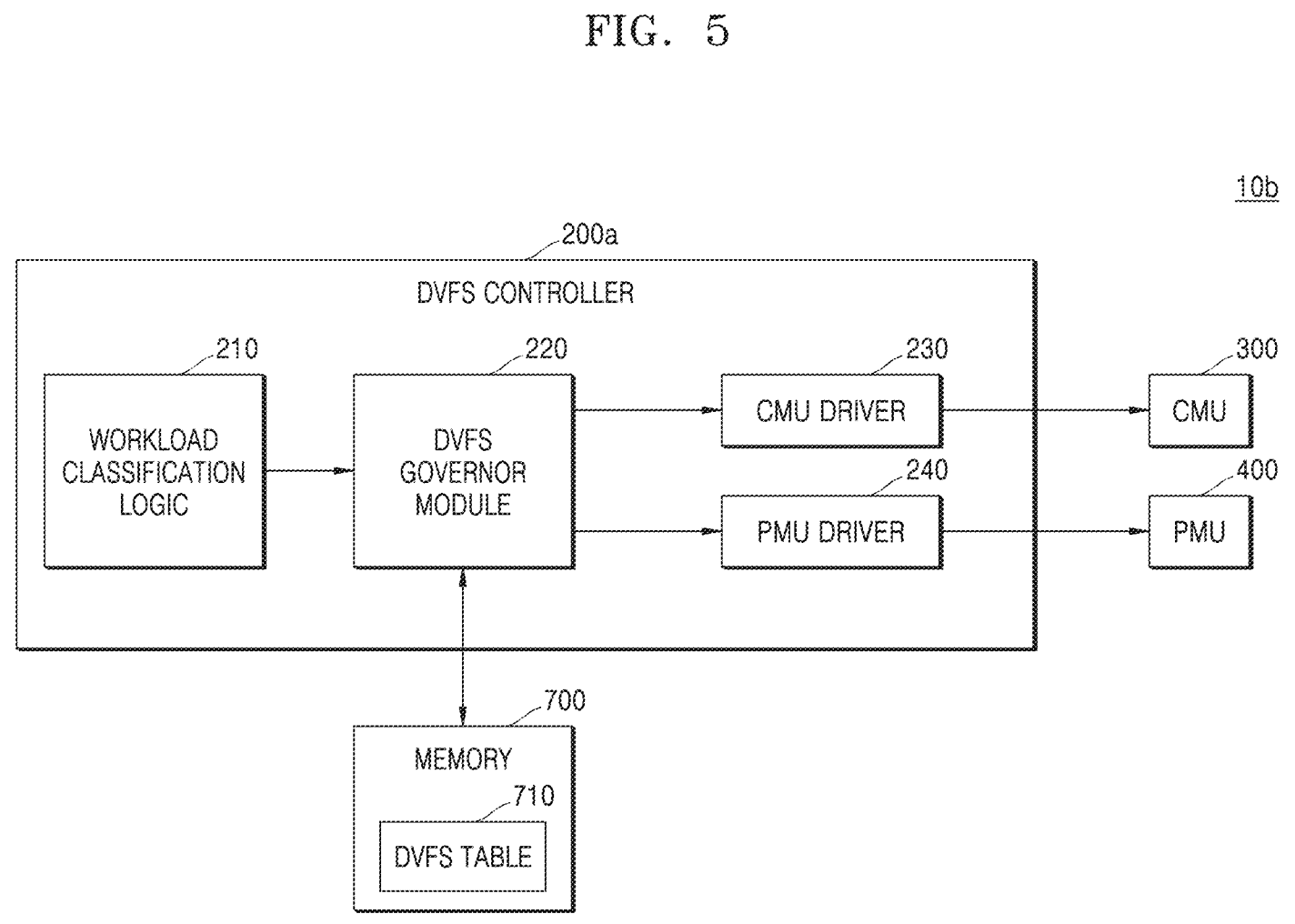

DVFS CONTROLLER

210
WORKLOAD CLASSIFICATION LOGIC

220
DVFS GOVERNOR MODULE

230
CMU DRIVER

240
PMU DRIVER

300
CMU

400
PMU

700
MEMORY

710
DVFS TABLE

| | FREQUENCY | VOLTAGE |
|---|---|---|
| w1 ----→ | f1 | v1 |
| w2 ----→ | f2 | v2 |
| | ⋮ | ⋮ |

INTEGRATED CIRCUIT CAPABLE OF PERFORMING DYNAMIC VOLTAGE AND FREQUENCY SCALING OPERATION BASED ON WORKLOAD AND OPERATING METHOD THEREOF

CROSS-REFERENCE TO RELATED APPLICATIONS

This application is based on and claims priority under 35 U.S.C. § 119 to Korean Patent Application No. 10-2022-0101594, filed on Aug. 12, 2022, and Korean Patent Application No. 10-2022-0170043, filed on Dec. 7, 2022, in the Korean Intellectual Property Office, the disclosures of which are incorporated by reference herein in their entirety.

BACKGROUND

The inventive concepts relate to integrated circuits, and more particularly, to integrated circuits capable of classifying the workload of a core based on monitored data and performing a dynamic voltage and frequency scaling (DVFS) operation based on the classified workload, and operating methods of the integrated circuits.

As computing systems such as mobile devices are becoming more compact, power management has emerged as an important issue. In particular, in the case of portable devices such as mobile devices, which use batteries with limited energy, power is reduced in order to reduce power consumption, but voltage has to be increased to improve the performance thereof. Thus, the need for efficient power management according to workload characteristics such as memory characteristics of a bus or a dynamic random access memory (DRAM) is increasing.

SUMMARY

The inventive concepts provide integrated circuits, operating methods of the integrated circuits, and computing systems, wherein the integrated circuits are capable of classifying a workload by considering not only a state of a central processing unit (CPU), or the like, but also the characteristics of a bus or a dynamic random access memory (DRAM), and a dynamic voltage and frequency scaling (DVFS) operation may be effectively performed by differently determining a scaling factor based on the classified workload. For example, power management of an application processor of a mobile device can be done by controlling a voltage through a DVFS operation in which a frequency and a voltage of a processing device are controlled according to a workload of a processing device embedded in the application processor.

According to some aspects of the inventive concepts, there is provided an integrated circuit including at least one core configured to process an instruction according to a voltage-frequency level, a shared buffer which receives a request from the at least one core, access an external memory according to the request, and receive a response from the external memory, a monitor configured to monitor the shared buffer to obtain a buffer capacity of the shared buffer and a response waiting time for the response received from the external memory, and a DVFS controller configured to receive, from the monitor, the buffer capacity and the response waiting time, classify a workload of the at least one core based on the buffer capacity and the response waiting time, and determine a scaling factor for the voltage-frequency level based on the classified workload.

According to some aspects of the inventive concepts, there is provided an operating method of an integrated circuit, the operating method including monitoring a shared buffer and obtaining a buffer capacity of the shared buffer and a response waiting time for a response received from an external memory, classifying a workload of a core based on the buffer capacity and the response waiting time, and determining a scaling factor for a voltage-frequency level of the core based on the classified workload of the core.

According to some aspects of the inventive concepts, there is provided a computing system including a processor, at least one memory, a bus connecting the processor to the at least one memory, a DVFS controller configured to classify a workload of at least one core based on a buffer capacity of a shared buffer and a response waiting time for a response received from the bus, determine a scaling factor based on the classified workload, and generate a voltage control signal and a clock control signal based on the determined scaling factor, a power management unit configured to adjust an amplitude of a power supply voltage provided to the at least one core in response to the voltage control signal, and a clock management unit configured to adjust a frequency of a clock signal provided to the at least one core, in response to the clock control signal, the processor including the at least one core configured to process an instruction according to the amplitude of the power supply voltage and a frequency of the clock signal, the shared buffer configured to receive a request from the at least one core, access the bus according to the request, and receive a response from the bus, and a monitor configured to monitor the shared buffer to obtain the buffer capacity and the response waiting time.

BRIEF DESCRIPTION OF THE DRAWINGS

Example embodiments will be more clearly understood from the following detailed description taken in conjunction with the accompanying drawings in which:

FIG. 1 is a block diagram of an integrated circuit according to some example embodiments;

FIG. 5 is a block diagram illustrating some example embodiments of an integrated circuit according to some example embodiments;

DETAILED DESCRIPTION

Figure 1:
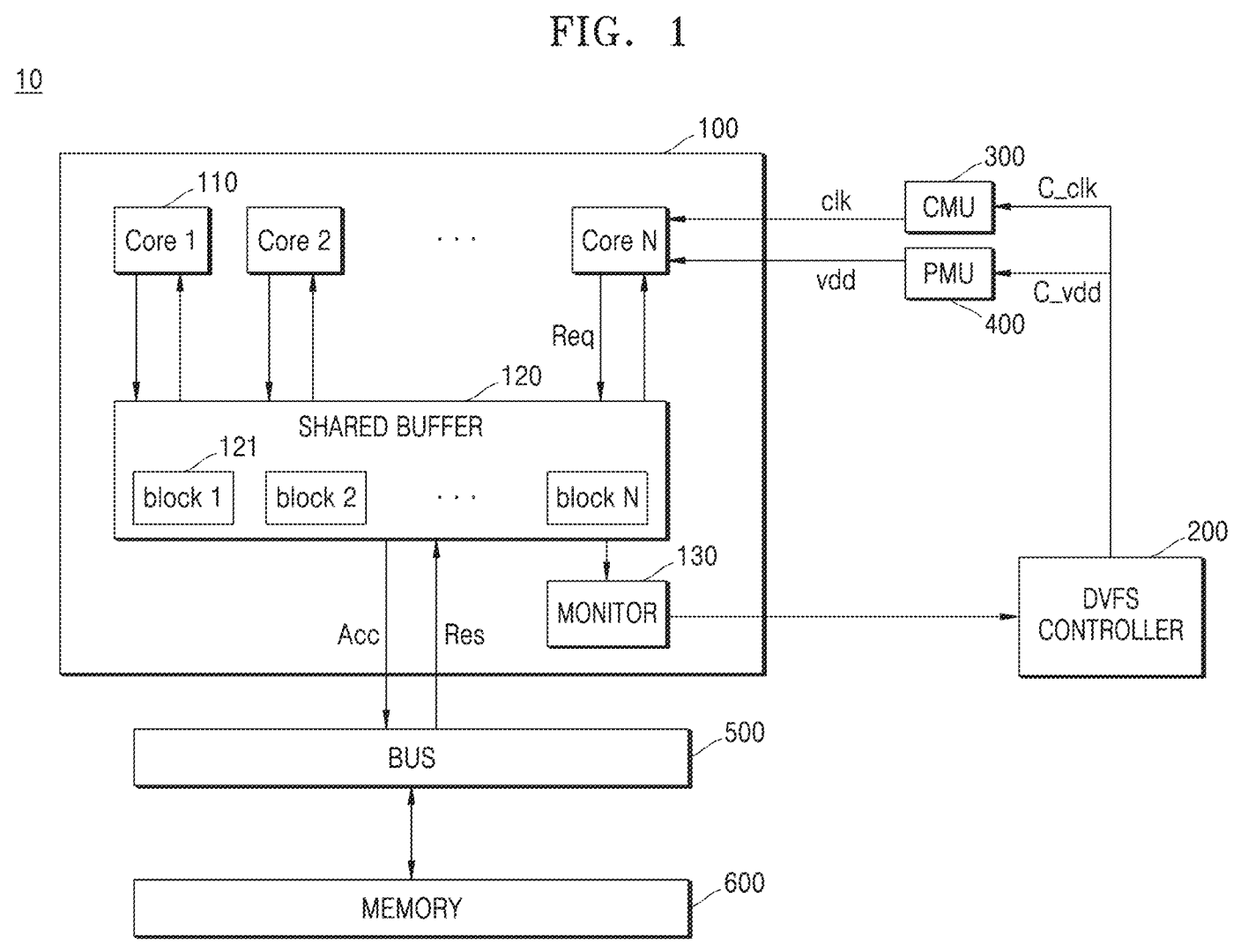
Figure 2:
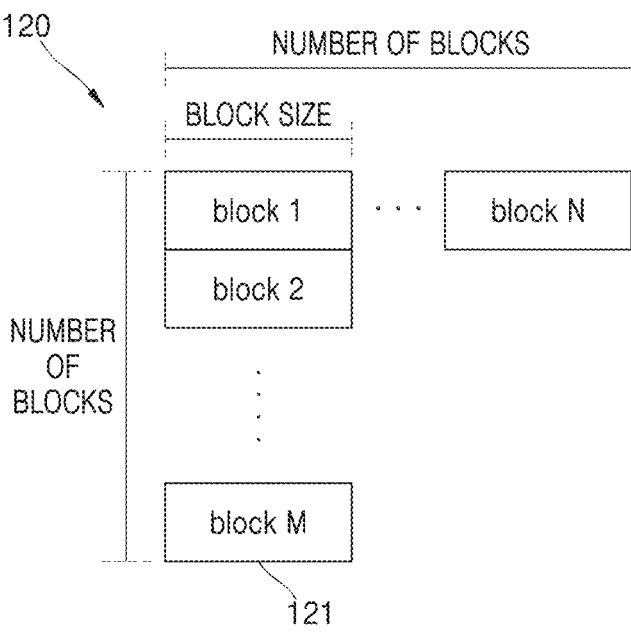
FIG. 2 is a block diagram for describing a shared buffer and data monitored by a monitor, according to some example embodiments.

FIG. 1 is a block diagram illustrating an integrated circuit according to some example embodiments.

Referring to FIG. 1, an integrated circuit 10 may include a processor 100, a dynamic voltage and frequency scaling (DVFS) controller 200, a clock management unit (CMU) 300, a power management unit (PMU) 400, a bus 500, and a memory 600. In some example embodiments, the processor 100, the DVFS controller 200, the clock management unit 300, the power management unit 400, the bus 500, and the memory 600 may be included in a single chip, that is, a system-on-chip (SoC), and the integrated circuit 10 may be referred to as an application processor (AP). However, in some example embodiments, the processor 100, the DVFS controller 200, the clock management unit 300, the power management unit 400, the bus 500, and the memory 600 may be included in a plurality of chips.

The integrated circuit 10 may be included in a stationary computing system such as a desktop PC, a server, and the like, and may be included in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile internet device (MID), a wearable computer, an internet of things (IoT) device, an internet of everything (IoE) device, and/or an e-book.

The processor 100 may include at least one core 110, a shared buffer 120, and a monitor 130. In some example embodiments, the processor 100 may execute a program composed of instructions. A program may include a plurality of subprograms, and a subprogram may be referred to as a subroutine, a routine, a procedure, a function, or the like.

The core 110 may process instructions independently. Hereinafter, a central processing unit (CPU) core will be mainly described as the core 110, but it is noted the example embodiments are not limited thereto. For example, the core 110 may include a CPU core, a graphics processing unit (GPU) core, a neural processing unit (NPU) core, or an image signal processor (ISP) core. As a plurality of cores 110 may be included in the processor 100, the processor 100 may be referred to as a multi-core processor. In some example embodiments, the core 110 may process an instruction according to a clock signal clk and a power supply voltage vdd, and the performance of the core 110 may depend on the clock signal clk and the power supply voltage vdd. Some example embodiments of the above will be described later with reference to FIGS. 6A and 6B.

The shared buffer 120 may include a buffer shared by the plurality of cores 110 in a multi-core processor. For example, the processor 100 may include a CPU, the plurality of cores 110 may include an L2 cache, and the shared buffer 120 may include an L3 cache. The shared buffer 120 may store data not included in the core 110 and may transmit/receive data to or from the core 110. In some example embodiments, data for the core 110 to process a command may not exist inside the core 110, and data may be requested Req from the shared buffer 120. The shared buffer 120 may receive a request Req from the core 110, and when data corresponding to the request Req exists in the shared buffer 120, the corresponding data may be transmitted to the core 110. When the data corresponding to the request Req does not exist in the shared buffer 120 (for example, when a cache miss has occurred), an external memory may be accessed Acc, and a response Res from the external memory may be received to obtain data corresponding to the request Req. For example, the shared buffer 120 may access Acc the memory 600 through the bus 500 and receive a response Res from the memory 600 through the bus 500. The shared buffer 120 may include a plurality of blocks 121, and some example embodiments regarding this will be described later with reference to FIG. 2.

The monitor 130 may monitor the shared buffer 120 and obtain a buffer capacity of the shared buffer 120 and a response waiting time for a response received from the external memory. In some example embodiments, the buffer capacity of the shared buffer 120 may represent a filled state of the capacity of the plurality of blocks 121, and the response waiting time for a response received from the external memory may be a period of time taken by the shared buffer 120 to receive a response Res from the memory 600 after accessing Acc the memory 600 through the bus 500. Some example embodiments of this will be described later with reference to FIGS. 3A and 3B.

In some example embodiments, the monitor 130 may monitor the core 110, and obtain, from the shared buffer 120, a period of time taken by the core 110 to receive data corresponding to the request Req. For example, the core 110 may include a CPU core and may include the L2 cache. The shared buffer 120 may include the L3 cache. Data for a CPU core to process an instruction may not be in the L2 cache, and may be requested Req from the L3 cache. The L3 cache may receive a request Req from the L2 cache, and if data corresponding to the request Req exists in the L3 cache, the corresponding data may be transmitted to the L2 cache. When data corresponding to the request Req does not exist in the L3 cache, the L3 cache may access Acc an external memory, receive a response Res from the external memory, and obtain data corresponding to the request Req. The L3 cache may transmit data obtained from the external memory to the L2 cache. The monitor 130 may monitor the L2 cache, request Req data from the L3 cache, and obtain a period of time taken until data corresponding to the request Req is received from the L3 cache.

The DVFS controller 200 may receive a buffer capacity of the shared buffer 120 from the monitor 130 and a response waiting time for a response received from an external memory, and classify a workload of the core 110 based on the buffer capacity and the response waiting time. In some example embodiments, the DVFS controller 200 may classify the workload of the core 110 as a first workload or a second workload, and the first workload may include more requests for accessing an external memory than the second workload. For example, the first workload may be a memory intensive workload, and the memory intensive workload may refer to a situation in which congestion occurs in the bus 500 or the memory 600 when a cache miss occurs during an operation of the processor 100. Congestion may refer to a condition, for example, in which a number of packets/signals (for example, commands) is greater than a number of packets/signals the processor 100 may receive and process, and other conditions as may be understood by one skilled in the art, for example related to physical, virtual, or other limits of the processor 100, bus 5900, the memory 600 and/or other components. The second workload may be a computing workload, and the computing workload is related to instruction processing of the core 110, and may refer to a situation in which a cache miss does not occur during an operation of the processor 100.

In some example embodiments, the DVFS controller 200 may classify the workload of the core 110 as the first workload when the buffer capacity and the response waiting time are equal to or greater than a threshold value. If the buffer capacity or the response waiting time is less than the threshold value, the DVFS controller 200 may classify the workload of the core 110 as the second workload. Some example embodiments of this will be described later with reference to FIGS. 2 to 4.

In some example embodiments, the DVFS controller 200 may receive, for example, from the monitor 130, a period of time taken by the core 110 to receive the data corresponding to the request Req from the shared buffer 120, and classify, based on the received period of time, the workload of the core 110 as the first workload or the second workload. The first workload may include more requests for accessing an external memory than the second workload. For example, the core 110 may be a CPU core and may include the L2 cache. The shared buffer 120 may be the L3 cache. When there is free space in the L3 cache capacity, the L3 cache may receive a request Req from the L2 cache, and respond to the request Req by receiving an access Acc to an external memory and obtain data corresponding to the response Res from the external memory. The period of time taken for the L2 cache to receive the data corresponding to the request Req from the L3 cache may be shorter than a threshold time, and the DVFS controller 200 may classify the workload of the core 110 as the second workload. When there is no free space in the L3 cache capacity (for example, when the capacity of the L3 cache is filled with data other than the data corresponding to the request Req), the L3 cache may not receive the request Req from the L2 cache, and may receive the request Req after performing an operation on the filled data. Then, data corresponding to the request Req may be obtained by accessing Acc the external memory and receiving a response Res from the external memory. The period of time taken for the L2 cache to receive the data corresponding to the request Req from the L3 cache may be longer than a threshold time, and the DVFS controller 200 may classify the workload of the core 110 as the first workload.

The DVFS controller 200 may determine a scaling factor for a voltage-frequency level based on the classified workload of the core 110. In some example embodiments, the scaling factor may be determined such that the voltage-frequency level decreases according to the workload of the classified core 110. For example, the DVFS controller 200 may classify the workload of the core 110 as a first workload or a second workload, and the first workload may include more requests for accessing an external memory than the second workload. The required performance of the core 110 having the first workload may be lower than that of the core 110 having the second workload. The performance of the core 110 may be dependent on the voltage-frequency level, and when the workload of the core 110 is classified as the first workload, the DVFS controller 200 may determine a scaling factor such that the voltage-frequency level decreases. Some example embodiments of this will be described later with reference to FIGS. 6A and 6B.

The DVFS controller 200 may generate a control signal based on the determined scaling factor. In some example embodiments, the DVFS controller 200 may generate a clock control signal C_clk for adjusting a frequency of the core 110 and transmit the clock control signal C_clk to the clock management unit 300. In some example embodiments, the DVFS controller 200 may generate a voltage control signal C_vdd for adjusting the power supply voltage vdd of the core 110, and transmit the voltage control signal C_vdd to the power management unit 400.

As the DVFS controller 200 classifies the workload of the core 110 based on the buffer capacity and the response waiting time obtained by the monitor 130 monitoring the shared buffer 120, the DVFS controller 200 may determine a scaling factor for a voltage-frequency level, differently according to the characteristics of the bus 500 or the memory 600. Accordingly, power consumption may be reduced, for example, more efficiently or easily, compared when the workload is not classified, and overhead may be reduced because additional calculation is not required compared to when the workload is classified using software. Although the DVFS controller 200 is described as being located outside the processor 100, the DVFS controller 200 may also be located inside the processor 100. Alternatively, or additionally, as described above, the use of the scaling factor for a voltage-frequency level may have a positive effect on the circuit 10, such as improved processing distribution and allocation, improved power usage, improved wear-and-tear on the device, etc.

The clock management unit 300 may generate a clock signal clk and adjust a frequency of the clock signal clk based on the clock control signal C_clk. For example, the clock management unit 300 may include an oscillator generating a clock signal clk based on the clock control signal C_clk. The clock management unit 300 may also be referred to as a clock generator or a clock generation circuit.

The power management unit 400 may generate the power supply voltage vdd and adjust an amplitude of the power supply voltage vdd based on the voltage control signal C_vdd. For example, the power management unit 400 may include a switching regulator that generates the power supply voltage vdd from a voltage provided from an external power source, based on the voltage control signal C_vdd. The power management unit 400 may also be referred to as a power management integrated circuit (PMIC).

The bus 500 may include a system bus to which a protocol having a certain standard bus standard is applied, and may include various Intellectual Property (IPs) connected to the system bus. As a standard specification of a system bus, an Advanced Microcontroller Bus Architecture (AMBA) protocol by Advanced RISC Machine (ARM) may be applied. Bus types of the AMBA protocol may include an Advanced High-Performance Bus (AHB), an Advanced Peripheral Bus (APB), an Advanced eXtensible Interface (AXI), AXI4, and AXI Coherency Extensions (ACE). In addition, other types of protocols such as SONICs Inc.'s uNetwork, IBM's Core-Connect, and OCP-IP's Open Core Protocol may be applied. Although the bus 500 is described as being included inside the integrated circuit 10, the bus 500 may be located outside the integrated circuit 10.

The memory 600 may correspond to various types of semiconductor memory devices, and may include, according to some example embodiments, a dynamic random access memory (DRAM) such as double data rate synchronous dynamic random access memory (DDR SDRAM), low power double data rate (LPDDR) SDRAM, a graphics double data rate (GDDR) SDRAM, a Rambus dynamic random access memory (RDRAM), and the like. Further, the memory 600 may be any one of a flash memory, a phase-change RAM (PRAM), a magnetoresistive RAM (MRAM), a resistive RAM (ReRAM), and a ferroelectric RAM (Fe-RAM). While the memory 600 is described as being included in the integrated circuit 10, the memory 600 may be located outside the integrated circuit 10 and may be referred to as an external memory in this case.

The integrated circuit 10 may include components other than those illustrated in FIG. 1. For example, the integrated circuit 10 may further include various types of functional blocks such as an input/output (IO) interface block, a universal serial bus (USB) host block, and a USB slave block.

FIG. 2 is a block diagram for describing a shared buffer and data monitored by a monitor, according to some example embodiments.

Referring to FIGS. 1 and 2, the shared buffer 120 of FIG. 2 may be the same as the shared buffer 120 of FIG. 1 and may include a plurality of blocks 121. Descriptions overlapping with those of FIG. 1 will be omitted. In some example embodiments, at least one block 121 may constitute one set, and the shared buffer 120 may include a plurality of sets. A total capacity of the shared buffer 120 may be determined based on the plurality of sets. For example, a size of the block 121 may be B bytes (B is an integer greater than or equal to 0), one set may include N or more (N is an integer greater than or equal to 1) blocks 121, and the shared buffer 120 may include M sets (M is an integer greater than or equal to 1). The total capacity of the shared buffer 120 may be determined as B*N*M bytes.

In some example embodiments, when a filled degree of the total capacity of the shared buffer 120 is greater than or equal to a threshold value, the DVFS controller 200 may classify the workload of the core 110 as a first workload. For example, when 70% or more of the total capacity of B*N*M bytes of the shared buffer 120 is filled, the DVFS controller 200 may classify the workload of the core 110 as the first workload.

In some example embodiments, each of the cores 110 may transmit a request Req only to a certain block among the plurality of blocks 121. For example, the request Req may include data designating a location of a certain block among the plurality of blocks 121.

In some example embodiments, the memory 600 may be classified into a plurality of regions (not shown), and each block 121 may access Acc only a certain region among the plurality of regions of the memory 600. For example, the request Req received by the shared buffer 120 from the core 110 may include an address, and the address may include data designating a location of a certain region of the memory 600.

Figure 3A:
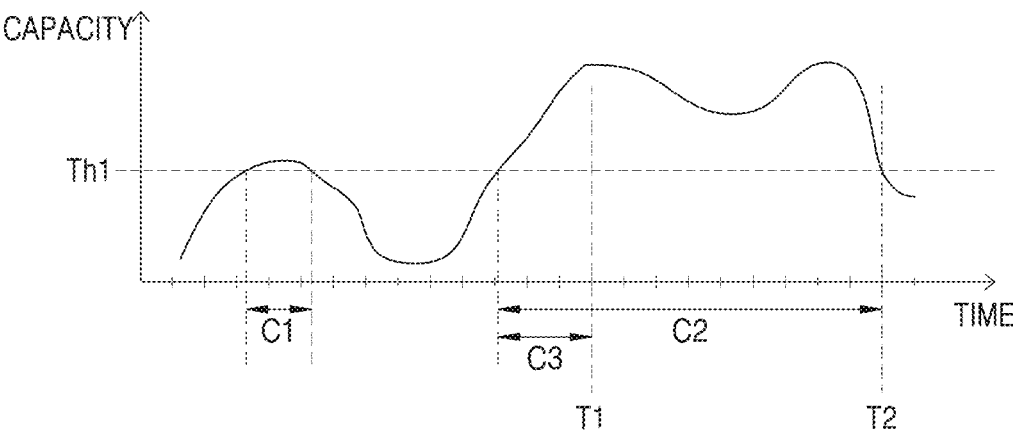
FIGS. 3A and 3B are graphs for describing a buffer capacity and a response waiting time, according to some example embodiments.
Figure 3B:
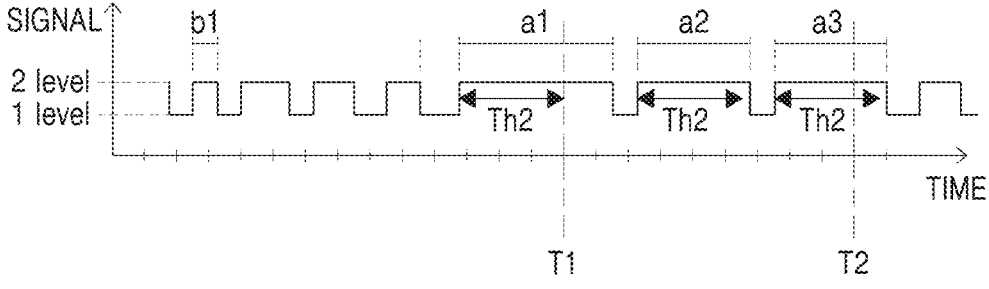

FIGS. 3A and 3B are graphs for describing a buffer capacity and a response standby time, according to some example embodiments.

Referring to FIGS. 1 and 3A, the graph of FIG. 3A may represent a capacity of the block 121 over time. In some example embodiments, when a number of blocks 121 in which the capacity of each block 121 is filled is greater than or equal to a threshold number, the buffer capacity of the shared buffer 120 may be labelled as full. For example, when the number of blocks 121 having a capacity filled to 70% (for example, a first threshold Th1) or more among the plurality of blocks 121 is 50% (for example, a threshold number of blocks) or more of the total number of blocks 121, the buffer capacity of the shared buffer 120 may be in a full state. Sections in which the buffer capacity is full may be section C1 and section C2.

Referring further to FIG. 3B, the graph of FIG. 3B may represent a response waiting time for a response received by the shared buffer 120 from an external memory. In some example embodiments, the response waiting time for a response received from the external memory may include a period of time taken by the shared buffer 120 to receive a response Res from the memory 600 after accessing Acc the memory 600 via the bus 500 (hereinafter referred to as a response waiting time). When the shared buffer 120 accesses Acc the memory 600 through the bus 500, a signal may transition from a first level (for example, logic low) to a second level (for example, logic high). When the shared buffer 120 receives a response Res from the memory 600 through the bus 500, the signal may transition from the second level to the first level. A period of time taken from a transition of the signal from the first level to the second level to the transition from the second level to the first level (for example, time a1, time a2, time a3, or time b1) may be a response waiting time.

In some example embodiments, when the buffer capacity of the shared buffer 120 indicates a full state, and the response waiting time is longer than a threshold time Th2, the DVFS controller 200 may classify a workload of the core 110 as a first workload among the first workload and a second workload. The first workload may include more requests for accessing an external memory than the second workload. For example, a state in which the buffer capacity of the shared buffer 120 is full may be the section C1 and section C2. The time a1, the time a2, and the time a3 may correspond to a period of time in which the response waiting time is longer than the threshold time Th2. At a point in time T1, the buffer capacity of the shared buffer 120 may indicate a full state, and the response waiting time may be longer than the threshold time Th2. At a point in time T2, the response waiting time is longer than the threshold time Th2, but the buffer capacity of the shared buffer 120 may not be in a full state. Accordingly, congestion may occur in the bus 500 or the memory 600 in a section from the point in time T1 to the point in time T2, and the DVFS controller 200 may classify the workload of the core 110 as the first workload.

In some example embodiments, the monitor 130 may monitor the shared buffer 120 and obtain an identifier (source ID). The identifier (source ID) may refer to an address of the core 110 that transmits the request Req to the shared buffer 120, and the DVFS controller 200 may receive the identifier (source ID) from the monitor 130. In the section from the point in time T1 to the point in time T2, the DVFS controller 200 may identify a certain core among the plurality of cores 110 according to an identifier (source ID), and classify a workload of the identified core as a first workload.

Figure 4:
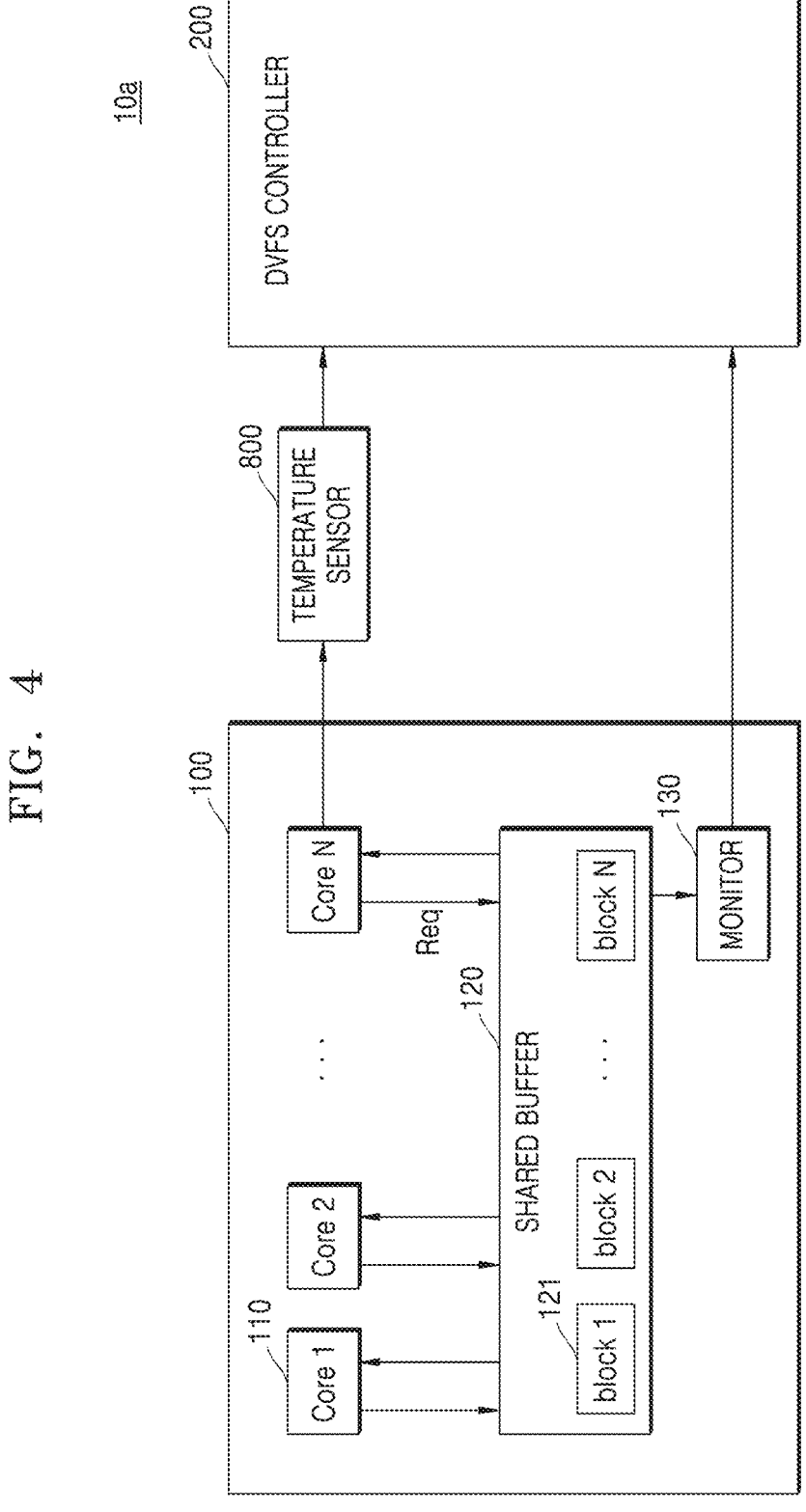
FIG. 4 is a block diagram illustrating some example embodiments of an integrated circuit according to some example embodiments.

FIG. 4 is a block diagram illustrating some example embodiments of an integrated circuit according to some example embodiments.

Referring to FIGS. 1 and 4, an integrated circuit 10a may include the processor 100, the DVFS controller 200 and a temperature sensor 800. In some example embodiments, the processor 100 and the DVFS controller 200 of FIG. 4 may be the same as the processor 100 and the DVFS controller 200 of FIG. 1, respectively. Descriptions overlapping with those of FIG. 1 will be omitted.

The temperature sensor 800 may sense a temperature of the processor 100 and provide temperature information according to a sensing result, to the DVFS controller 200. The temperature sensor 800 may include a thermistor and a memory (not shown) capable of storing temperature information. In some example embodiments, the temperature sensor 800 may sense the temperature of the cores 110. Temperature information according to a sensing result may be provided to the DVFS controller 200 and stored in a memory.

Referring further to FIGS. 3A and 3B, in some example embodiments, when the buffer capacity of the shared buffer 120 is not full, or the response waiting time is less than the threshold time Th2, the DVFS controller 200 may classify the workload of the core 110 as the second workload among the first workload and the second workload, based on the temperature information. The first workload may include more requests for accessing an external memory than the second workload. For example, the buffer capacity may not be full in sections other than the section C1 and the section C2. In the section C1, the buffer capacity is full, but the response waiting time (for example, time b1) may not exceed the threshold time Th2. In a section C3, the buffer capacity is full, but the response waiting time may not exceed the threshold time Th2. Accordingly, in the section before the point in time T1 or after the point in time T2, the buffer capacity of the shared buffer 120 may not be full or the response waiting time may be less than the threshold time Th2. In the section before the point in time T1 or after the point in time T2, when temperature information sensed by the temperature sensor 800 is equal to or greater than a threshold temperature, for example, may be a situation where the core 110 operates excessively to process an instruction, or a situation where no cache miss occurs during the operation of the processor 100. Accordingly, the DVFS controller 200 may classify the workload of the core 110 as the second workload.

In some example embodiments, the monitor 130 may monitor the shared buffer 120 and obtain an identifier (source ID). The identifier (source ID) may refer to an address of the core 110 that transmits the request Req to the shared buffer 120, and the DVFS controller 200 may receive the identifier (source ID) from the monitor 130. In the section before the point in time T1 or after the point in time T2, the DVFS controller 200 may identify a certain core among the plurality of cores 110 according to an identifier (source ID), and classify the workload of the identified core as the second workload.

FIG. 5 is a block diagram illustrating some example embodiments of an integrated circuit according to some example embodiments.

Referring to FIGS. 1 and 5, an integrated circuit 10b may include a DVFS controller 200a, the clock management unit 300, the power management unit 400, and a memory 700. In some example embodiments, the clock management unit 300 and the power management unit 400 of FIG. 5 may be the same as the clock management unit 300 and the power management unit 400 of FIG. 1, respectively. Descriptions overlapping with those of FIG. 1 will be omitted.

The DVFS controller 200a may include a workload classification logic 210, a DVFS governor module 220, a clock management unit driver 230, and a power management unit driver 240. The workload classification logic 210 may receive, from the monitor 130, an address of the core 110 that transmits a request Req from the monitor 130 to the shared buffer 120 (hereinafter referred to as an identifier), the buffer capacity of the shared buffer 120, and a response waiting time for a response received from an external memory. The workload classification logic 210 may identify a certain core among the plurality of cores 110 according to the identifier and classify a workload of the certain core based on the buffer capacity and the response waiting time. Classified workload data of the certain core may be transmitted to the DVFS governor module 220. For example, the workload classification logic 210 may classify the workload of the core 110 as a first workload or a second workload based on the buffer capacity and the response waiting time, and the first workload may include more requests for accessing an external memory than the second workload. The workload classification logic 210 may classify the workload of a certain core as the first workload when the buffer capacity is full and the response waiting time is longer than the threshold time, and transmit, to the DVFS governor module 220, data indicating that the certain core is classified as the first workload.

The DVFS governor module 220 may determine a scaling factor for a voltage-frequency level based on the classified workload data of a certain core. In some example embodiments, when the DVFS governor module 220 receives data indicating that a certain core is classified as the first workload, the DVFS governor module 220 may obtain, from the memory 700, a DVFS table 710 including a power supply voltage vdd and a frequency of a clock signal clk, which correspond to the first workload. The DVFS governor module 220 may determine a scaling factor for the voltage-frequency level based on the power supply voltage vdd and the clock signal clk corresponding to the first workload.

As described above, there may be an effect of improving power consumption of the circuit 10b by determining a scaling factor for the voltage-frequency level, for example, during a lower needs or slower period, and/or an effect of improving processing capability by determining a scaling factor for the voltage-frequency level, for example, during a higher needs or intensive period.

Hereinafter, a module may refer to hardware capable of performing functions and operations according to each name, or may refer to computer program code capable of performing specific functions and operations. However, the inventive concepts are not limited thereto and may refer to an electronic recording medium, for example, a processor, in which a computer program code capable of performing specific functions and operations is loaded. That is, a module may refer to a functional and/or structural combination of software for carrying out the inventive concepts.

The clock management unit driver 230 may generate a clock control signal C_clk based on a scaling factor determined by the DVFS governor module 220 and provide the clock control signal C_clk to the clock management unit 300.

The power management unit driver 240 may generate a power supply voltage control signal C_vdd based on the scaling factor determined by the DVFS governor module 220 and provide the power supply voltage control signal C_vdd to the power management unit 400.

The memory 700 may include the DVFS table 710. In some example embodiments, the DVFS table 710 may include a power supply voltage vdd and a frequency of a clock signal clk corresponding to each workload. The DVFS table 710 may include values that are hard-coded in the memory 700 or soft-coded and modifiable values. Modification of the DVFS table 710 may be performed by the DVFS governor module 220. Although one DVFS table 710 is illustrated in FIG. 5, a plurality of DVFS tables 710 may also be included. For example, a plurality of DVFS tables 710 may be created according to a buffer capacity, a response waiting time, and a workload.

Figures 6A, 6B:
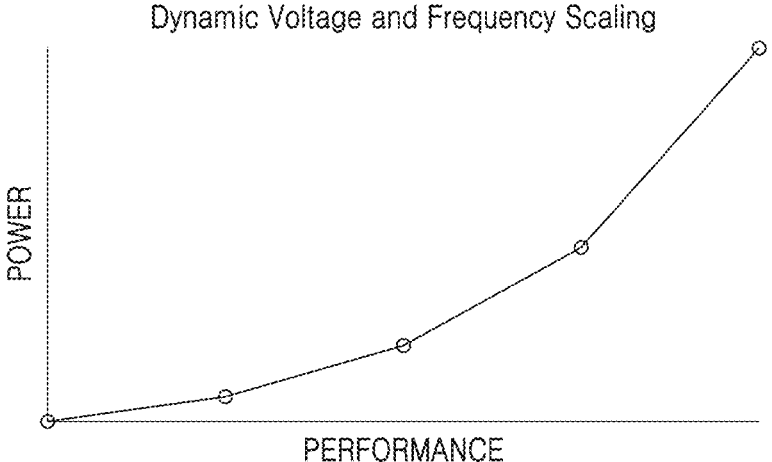
FIGS. 6A and 6B are, respectively, a graph and a table for describing a dynamic voltage and frequency scaling (DVFS) controller capable of determining a scaling factor, according to some example embodiments.

FIGS. 6A and 6B are, respectively, a graph and a table for describing a DVFS controller capable of determining a scaling factor, according to some example embodiments.

Referring to FIGS. 1 and 6A, the graph of FIG. 6A may indicate a relationship between performance and power consumption of the core 110. Power consumption P may satisfy Mathematical Expression 1 below.

$$P \propto V^2 f \qquad \text{[Mathematical Expression 1]}$$

V may refer to a power supply voltage, and f may refer to a frequency of the core 110. The power consumption P may be proportional to the square of a power supply voltage V and may be proportional to a frequency f of the core 110, and thus, the higher the power supply voltage V or the frequency f of the core 110, the greater the power consumption P may be. The performance of the core 110 may be dependent on a voltage-frequency level. For example, as the amplitude of the power supply voltage V increases and the frequency f of the core 110 increases, the core 110 may operate faster, thus improving the performance of the core 110. Accordingly, the power consumption P and the performance of the core 110 may have a proportional relationship to each other.

Referring further to FIGS. 5 and 6B, the workload classification logic 210 may classify the workload of the core 110 as a first workload or a second workload, and the DVFS governor module 220 may determine a scaling factor for a voltage-frequency level, based on the classified workload of the core 110. The table of FIG. 6B may be the DVFS table 710 of FIG. 5. In some example embodiments, when the DVFS governor module 220 receives data w1 indicating that the workload of the core 110 is classified as the first workload, the DVFS governor module 220 may obtain, from the memory 700, the DVFS table 710 including a power supply voltage v1 and a frequency f1 of a clock signal. The DVFS governor module 220 may determine a scaling factor for the voltage-frequency level based on the power supply voltage v1 and the frequency f1 of the clock signal. For example, the first workload may be a memory intensive workload, and the memory intensive workload may indicate a situation in which congestion occurs in the bus 500 or the memory 600 when a cache miss occurs during operation of the processor 100. When congestion occurs in the bus 500 or the memory 600, the congestion may be resolved by adjusting a number of requests Req by lowering the performance of the core 110, and since the performance of the core 110 is proportional to power consumption, power consumption may be reduced. Accordingly, the DVFS governor module 220 may determine a scaling factor such that the voltage-frequency level decreases, based on the power supply voltage v1 and the frequency f1 of the clock signal.

In some example embodiments, referring further to FIG. 4, when the temperature information detected by the temperature sensor 800 is equal to or greater than the threshold temperature, the DVFS governor module 220 may receive data w2 indicating that the workload of the core 110 is classified as the second work load, and obtain, from the memory 700, the DVFS table 710 including a power supply voltage v2 and a frequency f2 of a clock signal. For example, the second workload may be a computing workload, and the computing workload is related to instruction processing of the core 110, and may refer to a situation in which a cache miss does not occur during an operation of the processor 100. In a situation where a cache miss does not occur, the number of requests Req may not be adjusted by lowering the performance of the core 110, unlike for a workload classified as the first workload. However, when a temperature of the core 110 is equal to or higher than the threshold temperature, increasing the performance of the core 110 may cause a malfunction due to heat generation of the core 110, and this may lower the temperature of the core 110. Accordingly, the DVFS governor module 220 may determine a scaling factor such that the voltage-frequency level decreases, based on the power supply voltage v2 and the frequency f2 of the clock signal.

The DVFS table 710 may include a power supply voltage and a frequency of a clock signal according to data other than the illustrated data (w1 or w2). For example, when the temperature information detected by the temperature sensor 800 is less than the threshold temperature, the DVFS governor module 220 may receive data (not shown) indicating that the workload of the core 110 is classified as the second workload, and obtain, from the memory 700, the DVFS table 710 including a power supply voltage (not shown) and a clock signal frequency (not shown). The second workload may include a computing workload, and the core 110 may require high performance to process instructions. As the temperature of the core 110 is less than the threshold temperature, the increase in the performance of the core 110 may not cause a malfunction due to heat generation. Accordingly, the DVFS governor module 220 may determine a scaling factor such that the voltage-frequency level increases, based on the power supply voltage (not shown) and the frequency (not shown) of the clock signal.

As the power consumption P and the performance of the core 110 may be in a proportional relationship to each other, the DVFS governor module 220 may differently determine a scaling factor according to a workload of the core 110, and improve or efficiently manage power consumption and the performance of the core 110.

Figure 7:
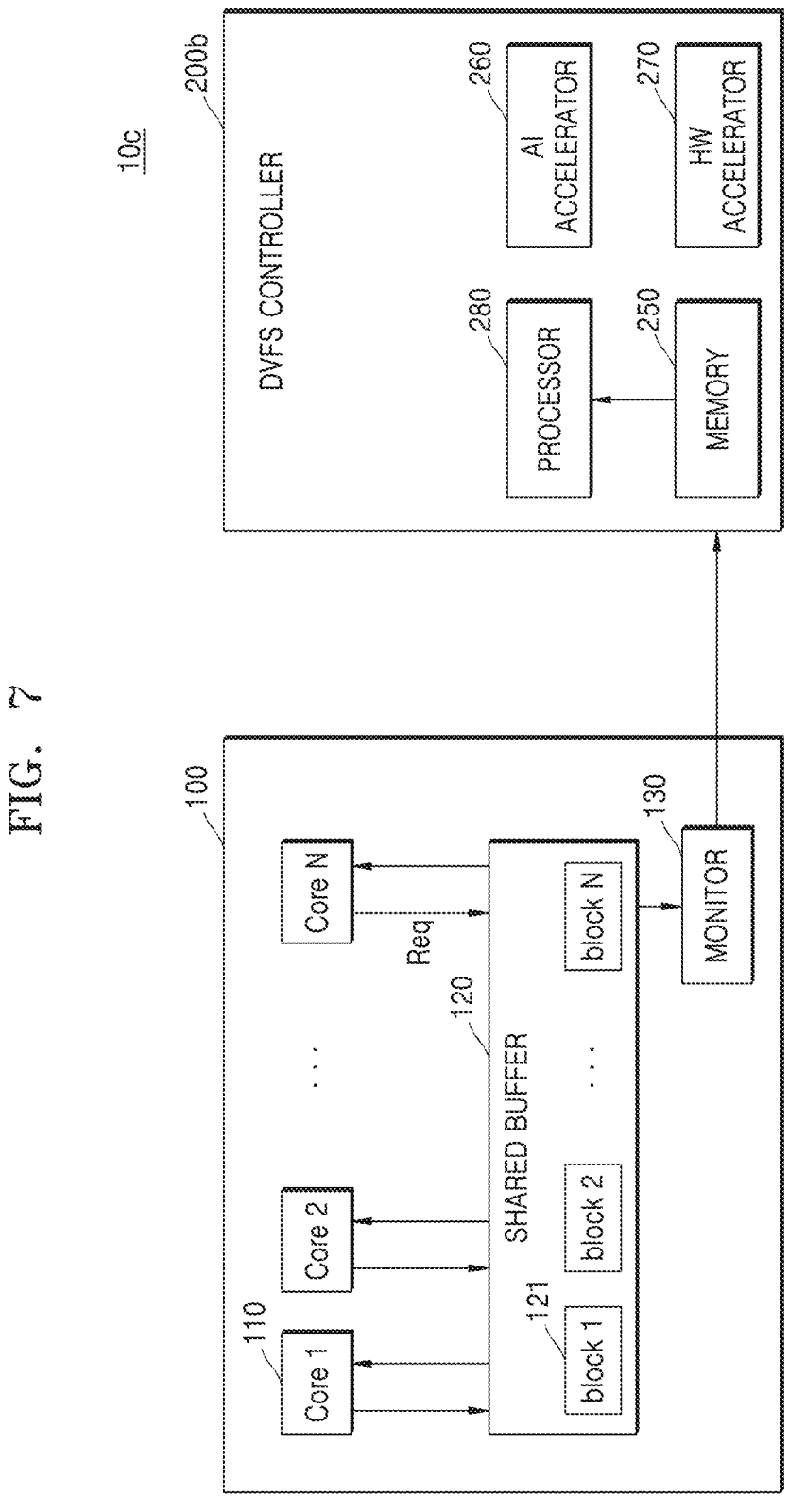
FIG. 7 is a block diagram illustrating some example embodiments of an integrated circuit according to some example embodiments.

FIG. 7 is a block diagram illustrating some example embodiments of an integrated circuit according to some example embodiments.

Referring to FIGS. 1 and 7, an integrated circuit 10c may include at least one processor 100 and a DVFS controller 200b. In some example embodiments, the processor 100 of FIG. 7 may be identical to the processor 100 of FIG. 1. Descriptions overlapping with those of FIG. 1 will be omitted.

The DVFS controller 200b may include at least one processor 280, a memory 250, an artificial intelligence (AI) accelerator 260, and a hardware accelerator 270. The at least one processor 280 may execute instructions. For example, the at least one processor 280 may execute an operating system by executing instructions stored in the memory 250, and execute applications executed on the operating system. In some example embodiments, by executing instructions, the at least one processor 280 may direct a task to the AI accelerator 260 and/or the hardware accelerator 270, and may obtain, from the AI accelerator 260 and/or the hardware accelerator 270, a result of performing the task. In some example embodiments, the at least one processor 280 may be an application specific instruction set processor (ASIP) customized for a specific purpose and may support a dedicated instruction set.

The memory 250 may have any structure for storing data. For example, the memory 250 may include a volatile memory device such as DRAM and static random access memory (SRAM), or a non-volatile memory device such as flash memory and/or resistive random access memory (RRAM).

The AI accelerator 260 may refer to hardware designed for AI applications. In some example embodiments, the AI accelerator 260 may include a Neural Processing Unit (NPU) for implementing a neuromorphic structure, and may generate output data by processing input data provided by the at least one processor 280 and/or the hardware accelerator 270, and provide the output data to the at least one processor 280 and/or the hardware accelerator 270. In some example embodiments, the AI accelerator 260 may be programmable and may be programmed by the at least one processor 280 and/or the hardware accelerator 270.

The hardware accelerator 270 may refer to hardware designed to perform a specific task at high speed. High speed may refer to performing the specific task in less time/cycles than a non-designed (e.g., generic) hardware performing the specific task. For example, the hardware accelerator 270 may be designed to perform data conversion such as demodulation, modulation, encoding, and decoding at high speed. The hardware accelerator 270 may be programmable and may be programmed by the at least one processor 280 and/or the hardware accelerator 270.

In some example embodiments, the AI accelerator 260 may execute an artificial neural network model. For example, with further reference to FIG. 1, the memory 250 may store training data. The training data may include a buffer capacity and a response waiting time obtained by monitoring the shared buffer 120, by the monitor 130, and include a scaling factor determined by the DVFS controller 200 based on the buffer capacity and the response waiting time. The AI accelerator 260 may execute an artificial neural network model, and the processor 280 may train the artificial neural network model by using the training data. After the training of the artificial neural network model is completed, the processor 280 may receive the buffer capacity and the response waiting time from the monitor 130. When the received buffer capacity and response waiting time correspond to the buffer capacity and the response waiting time stored in the memory 250, a scaling factor corresponding to the buffer capacity and the response waiting time may be determined using the trained artificial neural network model. After the artificial neural network model is trained, the DVFS controller 200 may determine a scaling factor without classifying the workload of the core 110 and generate a clock control signal and a voltage control signal, for example, more quickly than without the classification.

In some example embodiments, the training data may include an address, and the processor 280 may use the training data including the address, to train an artificial neural network model. For example, a request Req received by the shared buffer 120 from the core 110 may include an address, and the address may include data designating a location of a certain region a of the memory 600. After training of the artificial neural network model is completed, the processor 280 may receive an address from the monitor 130, and determine a scaling factor corresponding to the address. The training data may further include other data than the data described above.

Figure 8:
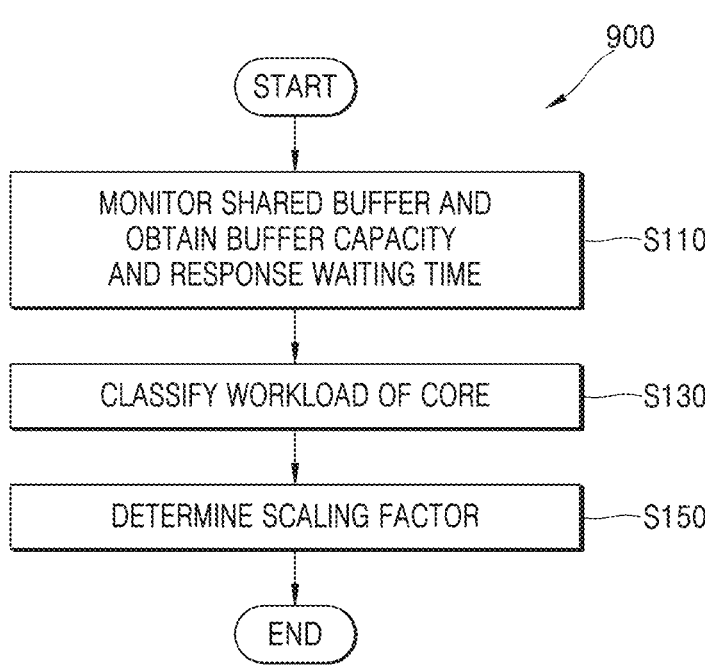
FIG. 8 is a flowchart of an operating method of an integrated circuit, according to some example embodiments.

FIG. 8 is a flowchart of an operating method of an integrated circuit, according to some example embodiments. As illustrated in FIG. 8, an operating method 900 of an integrated circuit may include a plurality of operations S110 to S150.

Referring to FIGS. 1 and 8, in operation S110, the shared buffer 120 is monitored, and the buffer capacity of the shared buffer 120 and the response wait time for the response received by the shared buffer 120 from the external memory may be obtained. In some example embodiments, the buffer capacity of the shared buffer 120 may represent a filled state of the capacity of the plurality of blocks 121, and a response waiting time for a response received from an external memory may be a period of time taken by the shared buffer 120 to receive a response Res from the memory 600 after accessing Acc the memory 600 through the bus 500.

In operation S130, the workload of the core 110 may be classified based on the buffer capacity and the response waiting time. In some example embodiments, when the buffer capacity and the response waiting time are equal to or greater than a threshold values, the DVFS controller 200 may classify the workload of the core 110 as the first workload. If the buffer capacity or the response waiting time is less than the threshold value, the DVFS controller 200 may classify the workload of the core 110 as the second workload. In some example embodiments, a temperature of the core 110 may be used in classifying the workload of the core 110.

In operation S150, a scaling factor for a voltage-frequency level of the core 110 may be determined based on the classified workload of the core 110. In some example embodiments, when the workload of the core 110 is classified as the first workload, the scaling factor may be determined such that a voltage-frequency level decreases. When the workload of the core 110 is classified as the second workload, the scaling factor may be determined such that a voltage-frequency level increases. In some example embodiments, a temperature of the core 110 may be used in determining the scaling factor for a voltage-frequency level of the core 110.

Figure 9:
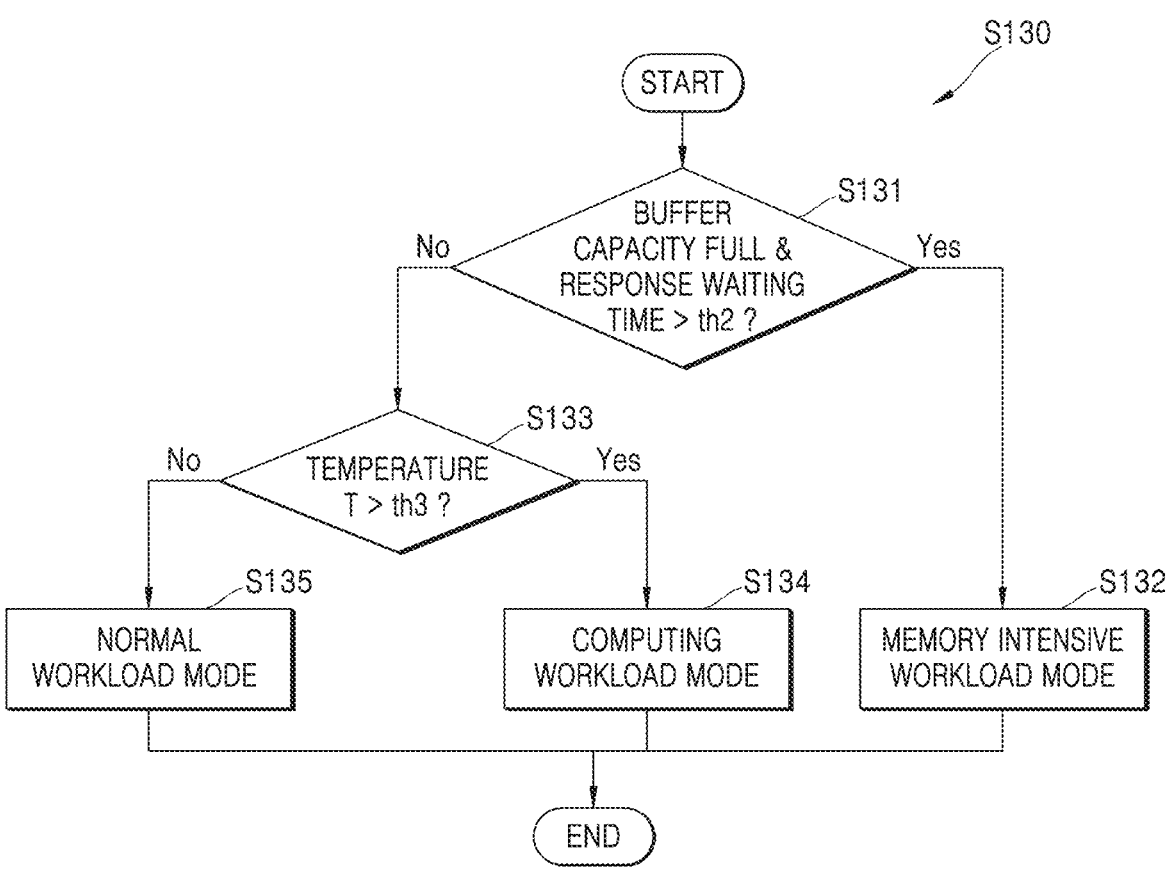
FIG. 9 is a flowchart of some example embodiments of an operating method of an integrated circuit, according to some example embodiments.

FIG. 9 is a flowchart of some example embodiments of an operating method of an integrated circuit, according to some example embodiments. Operation S130 of FIG. 8 may include some example embodiments of the operating method of the integrated circuit of FIG. 9. Some example embodiments of the operating method of the integrated circuit (S130) may include a plurality of operations S131 to S135.

Referring to FIGS. 1 and 9, some example embodiments of the operating method of an integrated circuit (S130) may indicate that the DVFS controller 200 operates in one of three modes. In operation S131, it may be determined whether the buffer capacity is full and whether the response waiting time is longer than the threshold time Th2. When the buffer capacity is full and the response waiting time is longer than the threshold time Th2, the DVFS controller 200 may operate in a memory intensive workload mode in operation S132. For example, in the memory intensive workload mode, the DVFS controller 200 may classify the workload of the core 110 as a memory intensive workload and determine a scaling factor such that the voltage-frequency level decreases.

When the buffer capacity is not full and/or the response waiting time is shorter than the threshold time Th2, the DVFS controller 200 may receive, from the temperature sensor of FIG. 4, temperature information T of the core 110. When the temperature information T of the core 110 is higher than a threshold temperature th3, the DVFS controller 200 may operate in a computing workload mode in operation S134. For example, in the computing workload mode, the DVFS controller 200 may classify the workload of the core 110 as a computing workload and determine a scaling factor such that the voltage-frequency level decreases. When the temperature information T of the core 110 is not higher than the threshold temperature th3, the DVFS controller 200 may operate in a normal workload mode in operation S135. For example, in the normal workload mode, the DVFS controller 200 may classify the workload of the core 110 as a normal workload, and may determine a scaling factor such that the voltage-frequency level increases.

Since the operation mode of the DVFS controller 200 is changed according to the buffer capacity and the response waiting time, and the scaling factor is determined differently according to the operation mode, power consumption may be adjusted as needed. For example, a scaling factor determined by the DVFS controller 200 when operating in the memory intensive workload mode, may be a scaling factor that further reduces the voltage-frequency level than a scaling factor determined by the DVFS controller 200 when operating in the computing workload mode.

Figure 10:
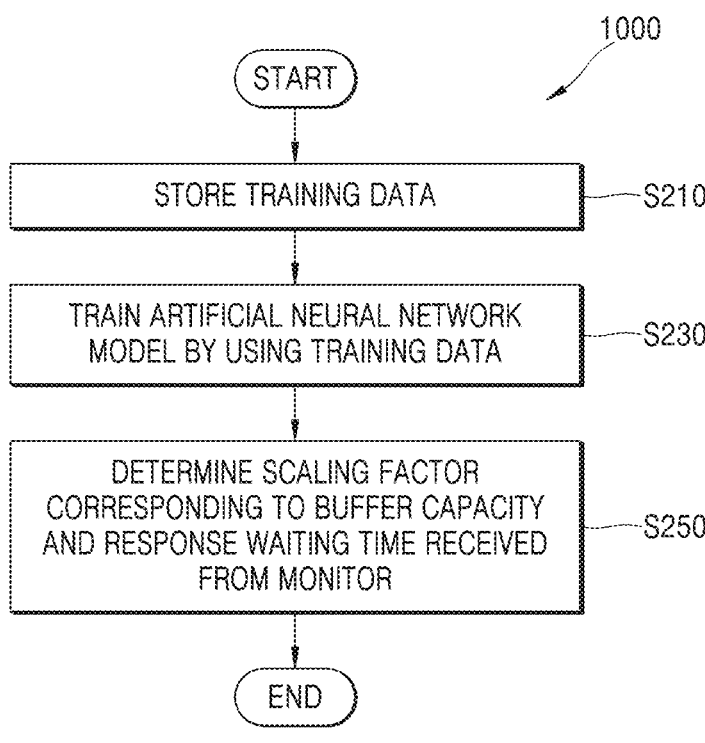
FIG. 10 is a flowchart of some example embodiments of an operating method of an integrated circuit, according to some example embodiments.

FIG. 10 is a flowchart of some example embodiments of an operating method of an integrated circuit, according to some example embodiments. As illustrated in FIG. 10, some example embodiments 1000 of an operating method of an integrated circuit may include a plurality of operations S210 to S250.

Referring to FIGS. 7 and 10, in operation S210, the memory 250 may store training data. In some example embodiments, the memory 250 may receive and store training data from the monitor 130. The training data may include a buffer capacity and a response waiting time obtained by monitoring the shared buffer 120 by the monitor 130, and include a scaling factor determined by the DVFS controller 200 based on the buffer capacity and the response waiting time.

In operation S230, an artificial neural network model may be trained using the training data. In some example embodiments, the AI accelerator 260 may execute an artificial neural network model, and the processor 280 may train the artificial neural network model by using the training data.

After training is completed in operation S250, the processor 280 may determine a scaling factor corresponding to the buffer capacity and the response waiting time received from the monitor. In some example embodiments, the processor 280 may receive the buffer capacity and the response waiting time from the monitor 130. When the received buffer capacity and response waiting time correspond to the buffer capacity and the response waiting time stored in the memory 250, a scaling factor corresponding to the buffer capacity and the response waiting time may be determined using the trained artificial neural network model. After the artificial neural network model is trained, the DVFS controller 200 may determine a scaling factor without classifying the workload of the core 110, and generate a clock control signal and a voltage control signal, for example, more quickly than without the classification.

Figure 11:
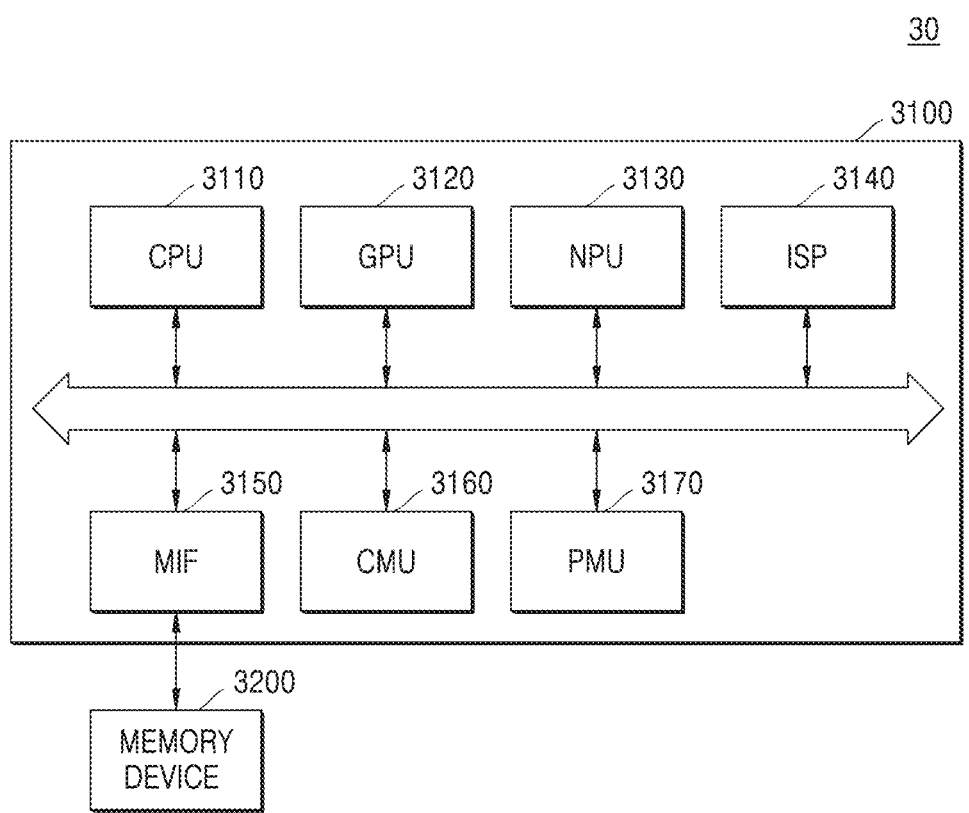
FIG. 11 is a block diagram illustrating system according to some example embodiments.

FIG. 11 is a block diagram illustrating a system according to some example embodiments.

Referring to FIG. 11, a system 30 may be implemented as a mobile phone, a smart phone, a tablet computer, a personal digital assistant (PDA), an enterprise digital assistant (EDA), a digital still camera, a digital video camera, a portable multimedia player (PMP), a personal navigation device or portable navigation device (PND), and/or a hand-held device such as a handheld game console, or an e-book.

The system 30 may include a SoC 3100 and a memory device 3200. The SoC 3100 may include a central processing unit (CPU) 3110, a graphics processing unit (GPU) 3120, a neural processing unit (NPU) 3130, an image signal processor (ISP) 3140, a memory interface (MIF) 3150, a CMU 3160, and a PMU 3170. The CPU 3110, the GPU 3120, the NPU 3130, the ISP 3140, and the MIF 3150 may be some example embodiments of the integrated circuit 10 described above with reference to FIGS. 1 to 10. Accordingly, the CPU 3110, the GPU 3120, the NPU 3130, the ISP 3140, and the MIF 3150 may each include the monitor 130 and the DVFS controller 200, and the DVFS controller 200 may perform a DVFS operation based on the buffer capacity and the response waiting time monitored by the monitor 130.

The CPU 3110 may process or execute commands and/or data stored in the memory device 3200 in response to a clock signal generated by the CMU 3160.

The GPU 3120 may acquire image data stored in the memory device 3200 in response to a clock signal generated by the CMU 3160. The GPU 3120 may generate data for an image output through a display device (not shown), from image data provided from the MIF 3150, or encode the image data.

The NPU 3130 may refer to any device that runs a machine learning model. The NPU 3130 may include a hardware block designed to run a machine learning model. The machine learning model may include a model based on an artificial neural network, a decision tree, a support vector machine, regression analysis, Bayesian network, genetic algorithm, and/or the like. Non-limiting examples of the artificial neural network may include a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

The ISP 3140 may perform a signal processing operation on raw data received from an image sensor (not shown) located outside the SoC 3100 and generate digital data having improved image quality.

The MIF 3150 may provide an interface to the memory device 3200 located outside the SoC 3100. The memory device 3200 may include DRAM, PRAM, ReRAM, or flash memory.

The CMU 3160 may generate a clock signal and provide the clock signal to components of the SoC 3100. The CMU 3160 may include a clock generator such as a Phase Locked Loop (PLL), a Delayed Locked Loop (DLL), and/or a crystal oscillator. The PMU 3170 may convert external power to internal power and supply power to the components of the SoC 3100 from the internal power.

Figure 12:
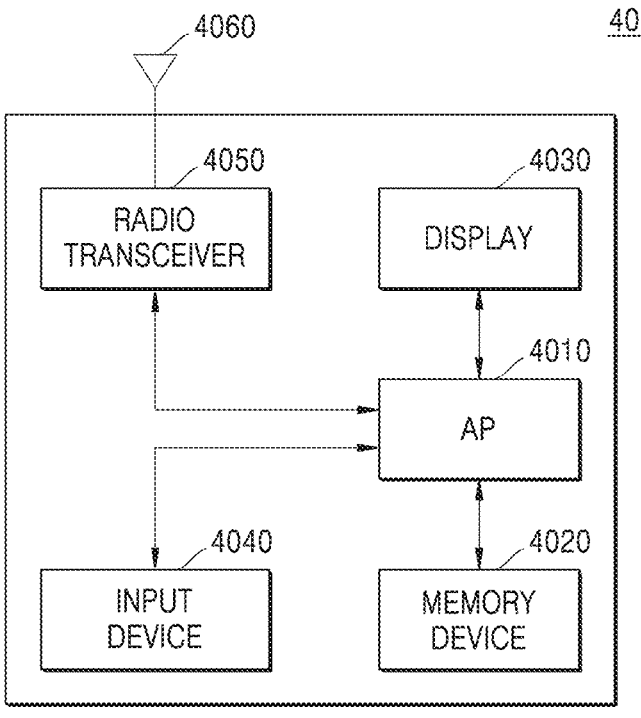
FIG. 12 is a block diagram illustrating a communication device including an application processor, according to some example embodiments.

FIG. 12 is a block diagram illustrating a communication device including an application processor, according to some example embodiments.

Referring to FIG. 12, a communication device 40 may include an application processor 4010, a memory device 4020, a display 4030, an input device 4040, and a radio transceiver 4050. The application processor 4010 may be some example embodiments of the integrated circuit 10 described above with reference to FIGS. 1 to 11.

The radio transceiver 4050 may transmit or receive a radio signal through an antenna 4060. For example, the radio transceiver 4050 may change a wireless signal received through the antenna 4060 into a signal that may be processed by the application processor 4010.

Accordingly, the application processor 4010 may process a signal output from the radio transceiver 4050 and transmit the processed signal to the display 4030. In addition, the radio transceiver 3250 may change a signal output from the application processor 4010, into a wireless signal, and output the wireless signal to an external device through the antenna 4060.

The input device 4040 may include a device capable of inputting a control signal for controlling the operation of the application processor 4010 or data to be processed by the application processor 4010, and may be implemented as a pointing device such as a touch pad or a computer mouse, or a keypad or a keyboard.

Here, the application processor 4010 may further include the monitor 130 and the DVFS controller 200 according to some example embodiments, and the DVFS controller 200 may perform a DVFS operation based on the buffer capacity and the response waiting time monitored by the monitor 130.

Although not illustrated in FIG. 12, the communication device 40 may further include a clock management unit providing clock signals to various components and a power management unit providing a power supply voltage.

By using the integrated circuit 10 according to the inventive concepts as described above, a workload of a core may be classified, and a scaling factor for a voltage-frequency level may be determined based on the classified workload, and thus, power consumption may be improved or efficiently controlled as needed.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to example embodiments thereof, it will be understood that various changes in form and details may be made therein without departing from the spirit and scope of the following claims.

What is claimed is:

1. A device comprising at least one integrated circuit, the integrated circuit comprising:
 a plurality of cores configured to process an instruction according to a voltage-frequency level;
 a shared buffer, comprising a plurality of blocks, configured to receive a request including data designating a certain block among the plurality of blocks from a first core of the plurality of cores, access an external memory according to the request, and receive a response from the external memory, wherein each of the plurality of blocks is configured to access a corresponding designated region among a plurality of regions of the external memory;
 a monitor configured to monitor the shared buffer to obtain a buffer capacity of the shared buffer, the buffer capacity corresponding to a number of respective ones of the plurality of blocks each using a threshold capacity being greater than or equal to a threshold number among the plurality of blocks, a response waiting time for the response received from the external memory, and an identifier of the first core; and
 a dynamic voltage and frequency scaling (DVFS) controller configured to receive, from the monitor, the buffer capacity, the response waiting time and the identifier, and to identify the first core according to the identifier and classify a workload of the first core based on the buffer capacity and the response waiting time, and determine a scaling factor for the voltage-frequency level of the first core based on the classified workload.

2. The device of claim 1, wherein
 the DVFS controller is further configured to classify the workload of the first core as a first workload or a second workload based on the buffer capacity and the response waiting time, and
 the first workload includes more requests for accessing the external memory than the second workload.

3. The device of claim 2, wherein, based on the buffer capacity indicating a full state, and the response waiting time is longer than a threshold time, the DVFS controller is further configured to classify the workload of the first core as the first workload.

4. The device of claim 3, wherein
 the buffer capacity that is in the full state indicates a state in which a number of blocks using the threshold capacity or more, among the plurality of blocks, is greater than or equal to the threshold number.

5. The device of claim 2, further comprising a temperature sensor configured to measure a temperature of the first core and transmit the measured temperature to the DVFS controller,
 wherein, based on the buffer capacity not being full or the response waiting time being shorter than a threshold time, the DVFS controller is further configured to classify the workload of the first core having the measured temperature greater than or equal to a threshold temperature as the second workload.

6. The device of claim 2, wherein, based on the classified workload being the first workload, the DVFS controller is further configured to determine the scaling factor such that the voltage-frequency level of the first core decreases to adjust a number of requests transmitted from the first core to the shared buffer.

7. The device of claim 1, wherein the DVFS controller further comprises:
 a memory configured to store training data including the buffer capacity, the response waiting time, and the scaling factor; and
 a processor configured to
  train an artificial neural network model by using the training data,
  determine the scaling factor corresponding to the buffer capacity and the response waiting time received from the monitor, by using the trained artificial neural network model after the training is completed.

8. The device of claim 7, wherein
 the training data comprises an address of the external memory included in the request, and the processor is further configured to, after the training is completed, receive the address from the monitor and determine the scaling factor corresponding to the address.

9. The device of claim 1, wherein each of the plurality of blocks is configured to access the corresponding designated region only from the plurality of regions of the external memory.

10. An operating method of an integrated circuit, the operating method comprising:

monitoring a shared buffer which comprises a plurality of blocks and obtaining a buffer capacity of the shared buffer, a response waiting time for a response received from an external memory, and an identifier of a first core of a plurality of cores, wherein the shared buffer receives a request including data designating a certain block among the plurality of blocks from the first core, and wherein each of the plurality of blocks is configured to access a corresponding designated region among a plurality of regions of the external memory, the buffer capacity corresponding to a number of respective ones of the plurality of blocks each using a threshold capacity being greater than or equal to a threshold number among the plurality of blocks;

classifying a workload of the first core based on the buffer capacity and the response waiting time; and determining a scaling factor for a voltage-frequency level of the first core based on the classified workload of the first core.

11. The operating method of claim 10, wherein the classifying of the workload of the first core based on the buffer capacity and the response waiting time comprises classifying the workload of the first core as a first workload or a second workload, and the first workload includes more requests for accessing the external memory than the second workload.

12. The operating method of claim 11, wherein the classifying of the workload of the first core as the first workload or the second workload further comprises, based on the buffer capacity indicating a full state, and the response waiting time being longer than a threshold time, classifying the workload of the first core as the first workload.

13. The operating method of claim 11, wherein the determining of the scaling factor for the voltage-frequency level of the first core based on the classified workload of the first core further comprises, based on the classified workload being the first workload, determining the scaling factor such that the voltage-frequency level of the first core decreases to adjust a number of requests transmitted from the first core to the shared buffer.

14. A computing system comprising:

a processor comprising a plurality of cores;

at least one memory;

a bus connecting the processor to the at least one memory;

a dynamic voltage and frequency scaling (DVFS) controller configured to identify a first core of the plurality of cores according to an identifier of the first core, and classify a workload of the first core based on a buffer capacity of a shared buffer and a response waiting time for a response received from the bus, determine a scaling factor based on the classified workload, and generate a voltage control signal and a clock control signal based on the determined scaling factor, the shared buffer comprises a plurality of blocks, wherein each of the plurality of blocks is configured to access a corresponding designated region among a plurality of regions of the at least one memory, the buffer capacity corresponding to a number of respective ones of the plurality of blocks each using a threshold capacity being greater than or equal to a threshold number among the plurality of blocks;

a power management unit configured to adjust an amplitude of a power supply voltage provided to the first core in response to the voltage control signal; and a clock management unit configured to adjust a frequency of a clock signal provided to the first core, in response to the clock control signal, wherein each of the plurality of cores configured to process an instruction according to the amplitude of the power supply voltage and the frequency of the clock signal;

the processor further comprising the shared buffer configured to receive a request including data designating a certain block among the plurality of blocks from the first core of the plurality of cores, access the bus according to the request, and receive the response from the bus; and a monitor configured to monitor the shared buffer to obtain the buffer capacity, the response waiting time and the identifier of the first core.

15. The computing system of claim 14, wherein the DVFS controller further comprises:

a DVFS governor module configured to determine the scaling factor;

a power management unit driver configured to generate a power supply voltage control signal based on the determined scaling factor; and a clock management unit driver configured to generate a frequency control signal based on the determined scaling factor.

16. The computing system of claim 14, wherein the DVFS controller is further configured to classify the workload of the first core as a first workload or a second workload based on the buffer capacity and the response waiting time, and the first workload includes more requests for accessing the at least one memory than the second workload.

17. The computing system of claim 16, wherein based on the response waiting time being longer than a threshold time, the DVFS controller is further configured to classify the workload of the first core as the first workload.

18. The computing system of claim 16, wherein, based on the classified workload being the first workload, the DVFS controller is further configured to determine the scaling factor such that the amplitude of the power supply voltage and the frequency of the clock signal decreases to adjust a number of requests transmitted from the first core to the shared buffer.

19. The computing system of claim 15, wherein the DVFS controller further comprises:

a memory configured to store training data including the buffer capacity, the response waiting time, and the scaling factor; and a processor configured to train an artificial neural network model by using the training data, and the processor is further configured to, after the training is completed, determine the scaling factor corresponding to the buffer capacity and the response waiting time received from the monitor, by using the trained artificial neural network model.

*   *   *   *   *